(12) United States Patent
Fish, Jr. et al.

(10) Patent No.: US 7,297,737 B2
(45) Date of Patent: Nov. 20, 2007

(54) PROCESS FOR EFFICIENTLY PRODUCING HIGHLY PLASTICIZED POLYAMIDE BLENDS

(75) Inventors: Robert B. Fish, Jr., Parkersburg, WV (US); Steven A. Mestemacher, Parkersburg, WV (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 529 days.

(21) Appl. No.: 10/915,624

(22) Filed: Aug. 10, 2004

(65) Prior Publication Data

US 2005/0038146 A1 Feb. 17, 2005

Related U.S. Application Data

(60) Provisional application No. 60/494,684, filed on Aug. 13, 2003.

(51) Int. Cl.
*C08K 5/42* (2006.01)

(52) U.S. Cl. ...................................... 524/157; 524/168

(58) Field of Classification Search ................ 524/157, 524/168
See application file for complete search history.

(56) References Cited

U.S. PATENT DOCUMENTS

| 2,965,599 | A | | 12/1960 | Gabler |
| 3,763,077 | A | | 10/1973 | Eusebi |
| 3,845,163 | A | | 10/1974 | Murch |
| 3,846,367 | A | | 11/1974 | Burton |
| 4,174,358 | A | | 11/1979 | Epstein |
| 5,541,267 | A | * | 7/1996 | Akkapeddi et al. ......... 525/432 |

FOREIGN PATENT DOCUMENTS

EP 0 052 944 6/1982

\* cited by examiner

*Primary Examiner*—Edward J. Cain

(57) ABSTRACT

A process for producing plasticized polyamide blends containing additives such as tougheners, reinforcing agents, and/or filler. High average molecular weight plasticized blends containing additives may be made using the process of the invention. Pipes and tubing may be made from the blends prepared using the process of the invention.

4 Claims, No Drawings

PROCESS FOR EFFICIENTLY PRODUCING HIGHLY PLASTICIZED POLYAMIDE BLENDS

CROSS REFERENCE TO RELATED APPLICATIONS

This application claims the benefit of U.S. Provisional Application No. 60/494,684, filed Aug. 13, 2003.

FIELD OF THE INVENTION

The present invention relates to a process for producing highly plasticized polyamide blends containing additional additives such as tougheners and/or fillers.

BACKGROUND OF THE INVENTION

It is well known that tougheners such as grafted rubbers or ionic polymers can be employed to improve the toughness of polyamides; see for example U.S. Pat. Nos. 4,174,358 and 3,845,163. It is also well known that plasticizers can be incorporated into polyamide blends to decrease their stiffness. N-butylbenzenesulfonamide (hereinafter BBSA) is an example of a well-known, effective plasticizer for polyamides; see, for example, Kohan, M. I. Ed. *Nylon Plastics Handbook*, Hanser: Munich, 1995; p. 365. Plasticized, toughened polyamide compositions such as ZYTEL® 350PHS2 NC010, manufactured by E.I. du Pont de Nemours, have been available for a number of years. Such resins are useful, for example, as jacketing for cables. However, while pipes and tubing can be made from such materials, it would be desirable to have available resins for making polyamide-containing pipes and tubing that possessed a lower flexural modulus, as such pipes and tubing would have great flexibility.

One method for lowering the flexural modulus would be to introduce higher levels of plasticizer to the polyamide composition. Thermoplastic polyamides are solids that are most efficiently blended on a molecular level with other materials by melting the polyamide in a suitable melt-processing apparatus such as an extruder and adding the additional materials to the molten polyamide and thoroughly mixing the resulting blend. When the blend is allowed to cool, the additional materials will be uniformly dispersed throughout the polyamide. As a result of high temperatures required for the melt-processing of polyamides, this method is not effective when large amounts of a volatile material must be added to the polyamide, as a significant portion of the volatile materials will be lost through the atmospheric pressure or vacuum vent port of the extruder. This requires that large excesses of the volatile material be added to the extruder to compensate for these losses, increasing the expense and complexity of the process.

Plasticized polyamide compositions are typically prepared by compounding the polyamide and other desired ingredients with the plasticizer in an extruder. However, because polyamide plasticizers are typically volatile relative to polyamides at the temperatures required to compound polyamides, it is difficult to incorporate large amounts of plasticizer using this method. For example, polyamide 6,12, a relatively low-melting polyamide, has a melting point of about 214° C. and BBSA has a boiling point of 340° C. Since it is necessary to compound polymers at temperatures well above their melting point, polyamide 6,12 is compounded at temperatures at which BBSA has a significant vapor pressure, and a significant portion of the BBSA introduced to the extruder would be lost through the vent port during compounding, making it impossible or very inefficient to achieve high loadings of BBSA. Other polyamides having higher melting points are compounded at even higher temperatures and will experience correspondingly higher losses of plasticizer. Plasticizers may be incorporated into polyamides during the polymerization process, but it is not practical or in some cases possible to incorporate additives such as tougheners or fibers or fillers during polymerization.

Higher molecular weight, less volatile plasticizers are available but they are not as efficient as BBSA, requiring even higher additive amounts. This negatively impacts other properties, such as tensile strength. Additionally, it is often desirable that plasticized polyamide resin compositions have a polyamide component with a high average molecular weight, and hence high melt and solution viscosity. Such compositions are often used for extrusion processes that form pipes, tubing, sheeting, etc where a high melt viscosity is desirable. When high molecular weight polyamides are passed through an extruder or otherwise melt-processed to incorporate other desired ingredients, however, these polyamides often are reduced in molecular weight, particularly when moisture is present in the polyamide, other ingredients, or extruder or other melt-processing equipment. Thus it is desirable to have a process that allows for the preparation of highly plasticized polyamides with a high average molecular that also contain additives. Such a process has been heretofore unknown and though they have long been desired, highly plasticized, high average molecular weight polyamides containing additives such as tougheners, reinforcing agents, and fillers are commercially unavailable, due to the difficulties that have been encountered when attempting to add both such additives and plasticizers to polyamides while efficiently using conventional melt-processing methods. These difficulties have been particularly acute when it is also necessary to maintain the molecular weight of high average molecular weight polyamides during the incorporation of plasticizer and additives.

It is an object of the present invention to provide an efficient process for producing a highly plasticized polyamide composition containing additives. It is a feature of the present invention to produce highly plasticized polyamide compositions containing additives such as tougheners and fillers. It is an advantage of the present invention to produce highly plasticized polyamide compositions containing additives wherein the polyamide has a high average molecular weight.

SUMMARY OF THE INVENTION

There is disclosed and claimed herein a process for producing a plasticized polyamide blend, comprising the steps of
  (a) polymerizing monomers in the presence of plasticizer to produce particles of plasticized polyamide,
  (b) melt-blending polyamide with one or more additives to produce particles,
  (c) cube-blending particles of plasticized polyamide and particles of polyamide melt-blended with one or more additives.

The additives used can include tougheners, fillers, and reinforcing agents.

The polyamide blends produced in the present invention may be formed into articles such as tubing and pipes.

DETAILED DESCRIPTION OF THE INVENTION

The process of the present invention comprises the steps of synthesizing a polyamide in the presence of a polyamide plasticizer to produce component (A), melt-blending polyamide with one or more additives to produce component (B) and cube-blending the components (A) and (B) to produce cube-blend (C). The additives used are materials that can dispersed uniformly throughout a polyamide resin composition by melt-processing. Examples of additives include tougheners, which can optionally be grafted to the polyamide via reactive extrusion and fillers and reinforcing agents such as mineral fillers and glass fibers.

Component (A) of the present invention is a polyamide containing a plasticizer. Component (A) is prepared by synthesizing the polyamide in the presence of the plasticizer, thus ensuring that the plasticizer is uniformly dispersed throughout the polyamide. The polyamide of component (A) is prepared by the polycondensation of dicarboxylic acid or dicarboxylic derivative monomers with diamine monomers, the polycondensation of aminocarboxylic acid monomers, the polymerization of lactam monomers, or a combination of any of the foregoing. Dicarboxylic acid derivatives can include diesters, acid esters, amides, and acid halides.

Aliphatic, alicyclic, and aromatic dicarboxylic acid and their derivatives may be used. Preferred are aliphatic diacids with 4 to 16 carbon atoms. Examples of suitable dicarboxylic acids or dicarboxylic acid derivatives include adipic acid, azelaic acid, sebacic acid, decanedioic acid, dodecanedioc acid, isophthalic acid, terephthalic acid and their derivatives. Aliphatic, alicyclic, and aromatic diamines may be used. Preferred are aliphatic diamines with 4 to 16 carbon atoms. Examples of suitable diamines are hexamethylenediamine, 2-methylpentamethylenediamine, dodecanediamine, m-xylylenediamine, p-xylylenediamine, and bis(p-aminocyclohexyl)methane. Examples of suitable lactams include caprolactam, and laurolactam. Examples of suitable aminocarboxylic acids include 6-aminocaproic acid, 7-aminoheptanoic acid, and 11-aminoundecanoic acid. Mixtures of monomers may be used to prepare the polyamide of component (A). Preferred monomers for the preparation of component (A) include caprolactam; hexamethylenediamine and adipic acid; hexamethylenediamine and dodecanedioic acid; 11-aminoundecanoic acid; and laurolactam.

Preferred plasticizers are miscible with the polyamide used in component (A). Examples of plasticizers suitable for use in the present invention include sulfonamides, including N-alkyl benzenesulfonamides and toluenesufonamides. Suitable examples include N-butylbenzenesulfonamide, N-(2-hydroxypropyl)benzenesulfonamide, N-ethyl-o-toluenesulfonamide, N-ethyl-p-toluenesulfonamide, o-toluenesulfonamide, p-toluenesulfonamide. Preferred is N-butylbenzenesulfonamide.

The polyamide of component (A) may be prepared by any means known to those skilled in the art, such as in an autoclave or using a continuous process. See, for example, Kohan, M. I. Ed. *Nylon Plastics Handbook*, Hanser: Munich, 1995; pp. 13-32. When preparing component (A), the polyamide monomers (i.e. the dicarboxylic acids or dicarboxylic acid derivatives and diamines and/or lactams and/or aminocarboxylic acids) are blended with one or more plasticizers prior to polymerization. Additional additives may optionally be added to the polymerization mixture, such as lubricants, antifoam, end-capping agents. When polymerization is complete, the resulting component (A) is a blend containing polyamide with plasticizer evenly dispersed throughout. Component (A) is removed from the polymerization vessel and, as will be understood by those skilled in the art, formed into a discrete, free-flowing particle form such as pellets, cubes, beads, or flakes, by, for example, forcing molten polymer through a die into strands and cooling and cutting the strands into the particles. The plasticizer will be present in from about 10 to about 30 weight percent, or preferably, from about 15 to about 25 weight percent of component (A). The inherent viscosity (IV) of the polyamide of component (A) will preferably be about 1.4 to about 1.8 when measured in m-cresol using ASTM 2857.

Component (B) of the present invention is a polyamide containing additives such as one or more of tougheners, reinforcing agents, and fillers. Component (B) is prepared by melt-blending polyamide with one or more additives or modifiers using any melt-blending technique known to those skilled in the art, such as a single or twin-screw extruder, blender, kneader, Banbury mixer, etc. Preferred are twin-screw extruders. Component (B) is, as will be understood by those skilled in the art, formed into a discrete, free-flowing particle form such as pellets, cubes, beads, or flakes, by, for example, forcing molten polymer through a die into strands and cooling and cutting the strands into the particles. The one or more additives may be present in preferably about 5 to about 50 weight percent, or more preferably in about 10 to about 30 weight percent based on the total weight of component (B).

Examples of suitable tougheners include partially neutralized copolymers of ethylene with acrylic acids and/or methacrylic acids (such as those available from E.I. DuPont de Nemours and Co. as Surlyn® ionomers) and polyolefins such as polyethylene, polypropylene, and ethylene/propylene/diene (EPDM) rubbers that are grafted with compatibilizing agents such as dicarboxylic acids, dicarboxylic acid esters and diesters, and anhydrides. Suitable compatibilizing agents include maleic anhydride, fumaric acid, and maleic acid. Tougheners grafted with compatibilizing agents can be used blended with other polyolefins such as polyethylene, polypropylene, and/or EPDM rubbers. Polyolefins derived from anhydride-containing comonomers may also be used. As will be appreciated by those skilled in the art, other tougheners for polyamides may also be used in the invention.

Reinforcing agents and fillers include glass fibers, carbon fibers, metal fibers, glass beads, milled glass, amorphous silica, talc, kaolin, wollastonite, mica, aluminum silicate, magnesium carbonate powdered quartz, feldspar, nanocomposites, and the like. Preferable among them is glass fiber. Glass fibers suitable for use in the present invention are those generally used as a reinforcing agent for thermoplastics resins and thermosetting resins. Preferred glass fiber is in the form of glass rovings, glass chopped strands, and glass yarn made of continuous glass filaments 3-20 micron meters in diameter.

Component (B) may optionally include additional additives such as thermal, oxidative, and/or light stabilizers; lubricants; mold release agents; flame retardants; and the like. Representative oxidative and thermal stabilizers include halide salts, e.g., sodium, potassium, lithium with copper salts, e.g., chloride, bromide, iodide; hindered phenols, hydroquinones, and varieties of substituted members of those groups and combinations thereof. Representative ultraviolet light stabilizers, include various substituted resorcinols, salicylates, benzotriazoles, benzophenones, and the like. Representative lubricants and mold release agents include stearic acid, stearyl alcohol, and stearamides. Representative organic dyes include nigrosine, while representative pigments, include titanium dioxide, cadmium sulfide, cadmium selenide, phthalocyanines, ultramarine blue, carbon black, and the like. Flame retardants may include halogenated organic compounds such as decabromodiphenyl ether, halogenated polymers such as poly(bromostyrene) and brominated polystyrene, melamine pyrophosphate, melamine cyanurate, melamine polyphosphate, red phosphorus, and the like.

The components (A) and (B) are blended in solid form by tumbling, stirring, or otherwise homogeneously mixing the particles at a temperature below the melting point of either component to form cube blend (C). Cube blend (C) may be formed by tumbling components (A) and (B) in a drum, mixing them in an orbital or twin-cone blender, feeding them from separate loss-in-weight feeders into a common vessel, and other techniques that will be known to those skilled in the art. The particles of components (A) and (B) are preferably similar in size and shape to avoid segregation of the components in cube blend (C).

Cube blend (C) may be further melt processed to form articles. Examples of suitable melt processing techniques include extrusion, blow molding, injection blow molding, and injection molding. Examples of articles formed include pipes, tubing, films, and sheets. The inherent viscosity of the articles is preferably about 1.20 to about 1.60, or more preferably about 1.35 to about 1.55 when measured m-cresol using ASTM 2857.

EXAMPLES

Example 1

Component (A) was prepared in a batch autoclave polymerization process. An aqueous polyamide 6,12 salt solution (2571 kg), prepared from hexamethylenediamine and dodecanedioic acid in water, with a pH of about 7.6 and a salt concentration of 45%, was charged into an evaporator. An aqueous solution containing 10 weight percent antifoam agent (250 g), hexamethylenediamine (4000 g), and N-butylbenzensulfonamide (222 kg) were added to the solution in the evaporator, which was then concentrated by increasing the temperature to 134° C. and allowing the pressure to rise to 35 psia. The concentrated solution was then charged into an autoclave along with 82 g of aqueous 76% phosphoric acid solution. The solution was heating while allowing the pressure to rise to 265 psia. Steam was vented and heating was continued until the temperature of the batch reached 255° C. The pressure was then reduced slowly to 18.9 psia, while the batch temperature was held at 235° C. Pressure was then lowered to 3 psia while the batch temperature rose to 264° C. and was held at that temperature and pressure for 30 minutes. Finally, the polymer melt was extruded into strands, cooled, cut into pellets, and dried at 160° C. under nitrogen.

Component (B) was prepared by melt-blending an anhydride-functionalized EPDM toughener (FUSABOND® N MF521 D, available from E.I. du Pont de Nemours & Co., Inc., Wilmington, Del.) with polyamide 6,12 (ZYTEL® 158 NC010, also available commercially from E. I. DuPont de Nemours & Co.) and the thermal and oxidative stabilizers Chimassorb 944F, Irgafos 168, Irganox 1098, and Tinuvin 234 (all available from Ciba Specialty Chemicals, Tarrytown, N.Y.).

Polyamide 6,12 (59.2 kg), Chimassorb 944F (1287 g), Irgafos 168 (1693.9 g), Irganox 1098 (1693.9 g), and Tinuvin 234 (2096.4 g) were well-mixed as dry ingredients by tumbling them together in a drum. This blend was introduced to the rear barrel of a ten-barrel 57 mm Werner & Pfleiderer twin-screw extruder at a rate of 65.48 lb/hr using a loss-in-weight feeder. The anhydride-functionalized EPDM toughener was also added to the rear barrel at a rate of 25.27 lb/hr using an additional loss-in-weight feeder. Polyamide 6,12 was also introduced to the sixth barrel from the rear of the extruder at a rate of 58.8 lb/hr using a loss-in weight feeder and a side feeder.

The extruder was operated at a screw rpm of 250, and vacuum of about 0.47-0.51 bar was applied at barrel 9. The barrel temperatures were set at about 240° C. and a die temperature was set at about 250° C. The melt temperature during the extrusion process were between 280 and 285° C. The polymer strands coming from the extruder were quenched in water and fed to a cutter. The hot pellets were collected in a vessel that was continuously swept with nitrogen gas to avoid moisture absorption from the air.

Pellets of component (A) (5.9 kg) and component (B) (3.2 kg) were combined in a drum and cube-blended by tumbling the drum at room temperature. The moisture in the pellets of the resulting cube blend was adjusted to between 0.1 weight percent and 0.2 weight percent by drying or adding additional water as required. Test bars were molded from the cube blend in an injection molding machine according to ISO methods. The molded bars were tested in their dry-as-molded state using ISO methods. Inherent viscosity was measured in m-cresol using ASTM 2857. The data are shown in Table 1.

TABLE 1

| | Example 1 |
|---|---|
| Elongation at break (%) | 281 |
| Flexural modulus (MPa) | 753 |
| Notched Izod impact (0° C.) | 19.5 |
| Notched Izod impact (23° C.) | 40.7 |
| Tensile strength (MPa) | 52.1 |
| Inherent viscosity in m-cresol | 1.539 |

What is claimed is:

1. A process for producing a plasticized polyamide blend, comprising the steps of
   (a) polymerizing monomers in the presence of plasticizer to produce particles of plasticized polyamide,
   (b) melt-blending polyamide with one or more additives to produce particles,
   (c) cube-blending particles of plasticized polyamide and particles of polyamide melt-blended with one or more additives.

2. The process of claim 1 wherein the additives are tougheners, reinforcing agents, or fillers.

3. The process of claim 1 wherein the plasticized polyamide has an inherent viscosity of about 1.4 to about 1.8.

4. The process of claim 1 wherein the plasticizer is a sulfonamide.

* * * * *